Aug. 25, 1931.  H. D. CHURCH  1,820,299
VALVE ACTUATING MECHANISM
Filed April 19, 1929  4 Sheets-Sheet 2
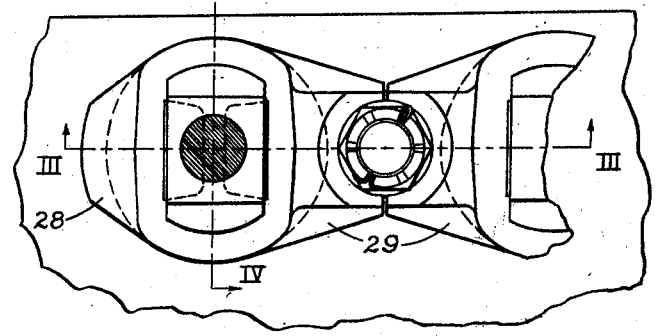
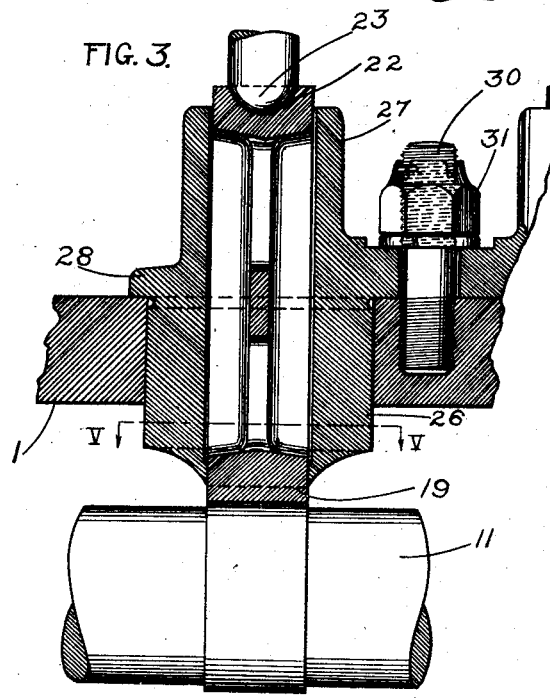
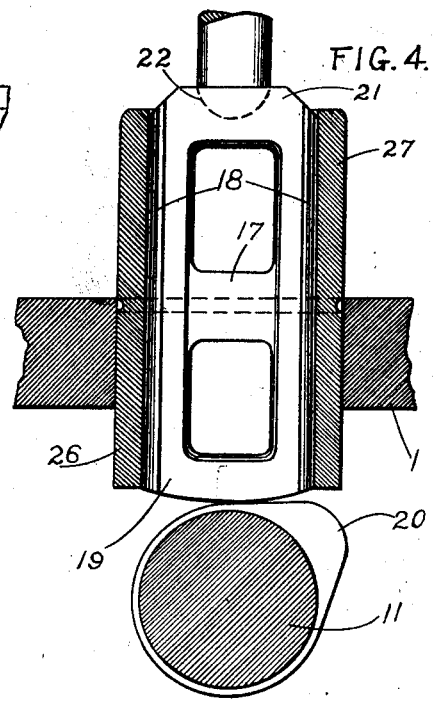
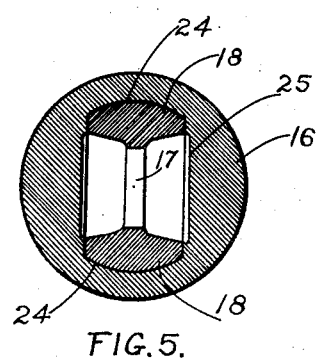
INVENTOR.
Harold D. Church
BY
Harvey R. Hawgood
ATTORNEY.

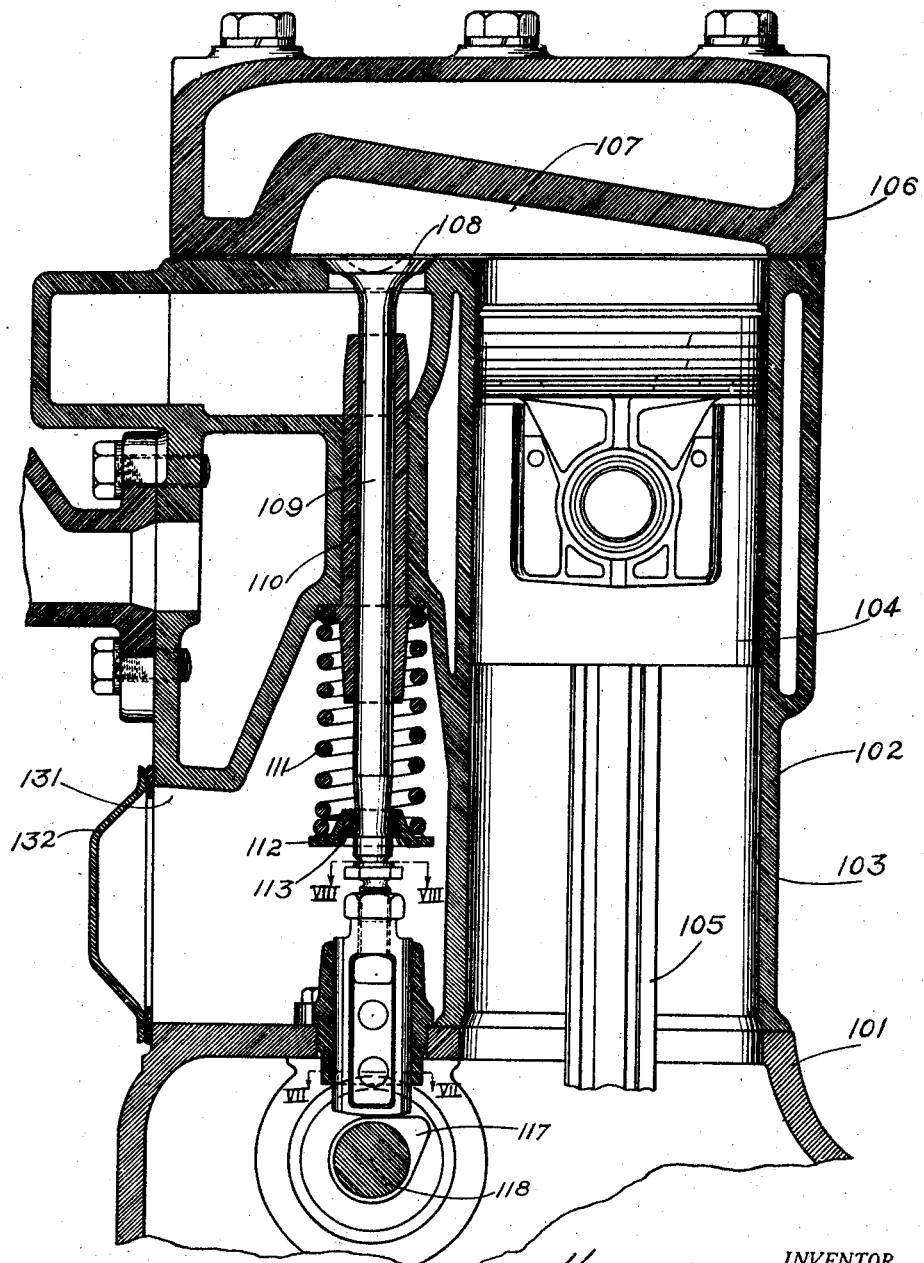

Aug. 25, 1931.   H. D. CHURCH   1,820,299
VALVE ACTUATING MECHANISM
Filed April 19, 1929   4 Sheets-Sheet 4

INVENTOR.
Harold D. Church
BY
Harvey R. Hawgood
ATTORNEY.

Patented Aug. 25, 1931

1,820,299

UNITED STATES PATENT OFFICE

HAROLD D. CHURCH, OF CLEVELAND, OHIO, ASSIGNOR TO THE WHITE MOTOR COMPANY, OF CLEVELAND, OHIO, A CORPORATION OF OHIO

VALVE ACTUATING MECHANISM

Application filed April 19, 1929. Serial No. 356,367.

This invention relates to valve actuating mechanism and is particularly well adapted for use in the actuation of valves of internal combustion motors.

An object of the invention is to provide a valve actuator which will have bearing surfaces so arranged that wear upon the same will be slight.

Another object is to provide an actuator for valves of the like which will be extremely light in weight.

Another object is to provide a valve tappet which will have relatively small bearing area and in which the area will be so disposed that all lateral forces imposed upon the tappet will be transmitted by compression through the tappet and directly to the bearing faces thereof.

Another object is to provide a tappet in which dirt is effectively excluded from between the bearing surfaces of the tappet and its guide.

Another object is to provide a tappet which will have its bearing surfaces so arranged that all transverse forces will be substantially normal to a large portion thereof.

Another object is to provide a valve tappet which may be constructed of very little material and yet will present adequate bearing surfaces.

Other objects will hereinafter appear:

The invention will be better understood from the description of two particular embodiments thereof, illustrated in the accompanying drawings, in which;

Figure 2 is a fragmentary plan view of the valve tappets and guides of Figure 1 taken on line II—II thereof;

Figure 3 is a longitudinal view of the parts of Figure 2 taken on line III—III thereof;

Figure 4 is a sectional view taken on line IV—IV of Figure 2;

Figure 5 is a sectional view of one tappet and guide taken on line V—V of Figure 3;

Figure 6 is a transverse sectional view of a motor of the L head type showing a valve actuating mechanism constituting another embodiment of the invention;

Figure 1:
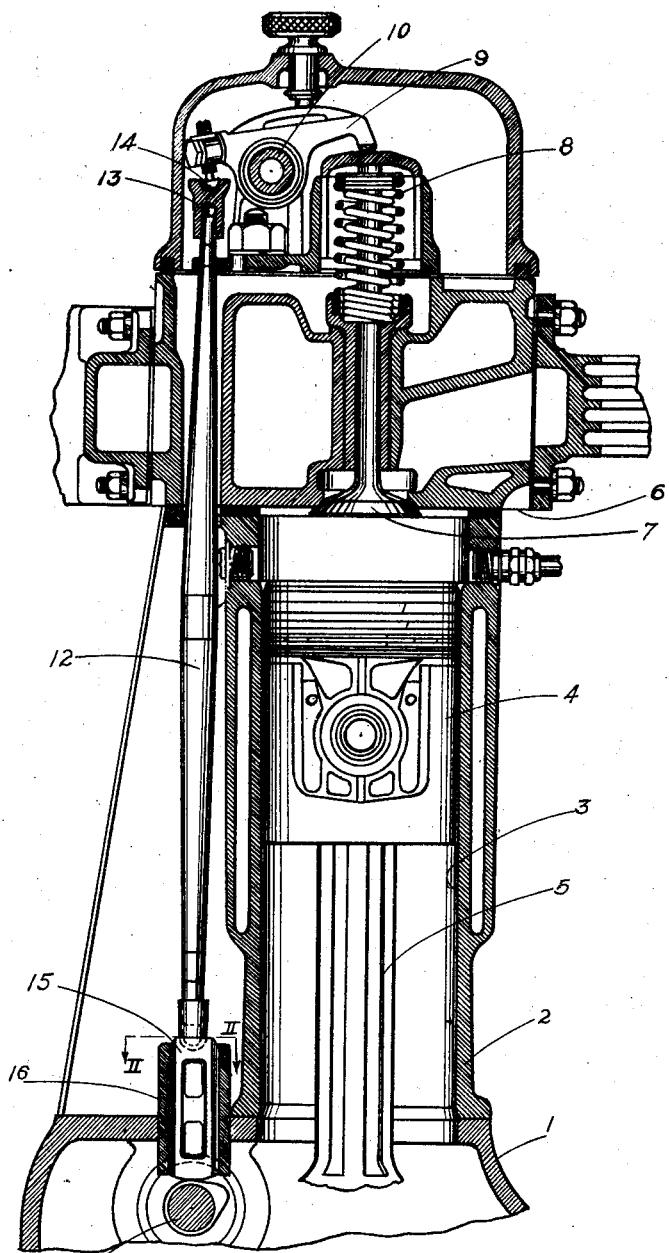
Figure 1 is a transverse sectional view of an internal combustion motor of the valve-in-head type, illustrating one valve actuating mechanism embodying the invention.
Figure 7:
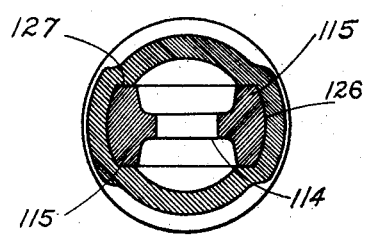
Figure 7 is a sectional view on line VII—VII of Figures 6 and 9.
Figure 8:
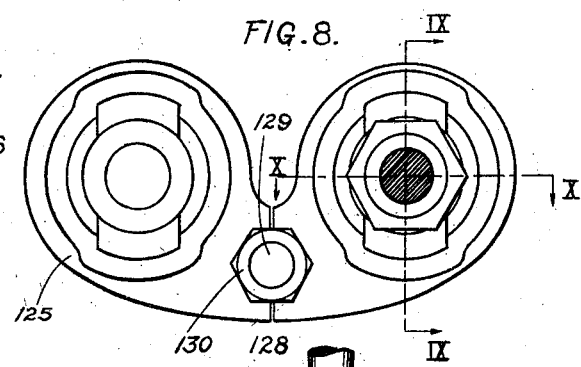
Figure 8 is a fragmentary plan view of the tappets and guides taken on line VIII—VIII of Figure 6.
Figure 9:
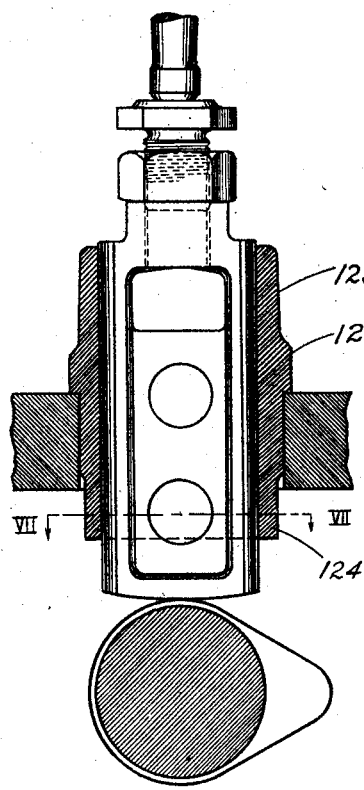
Figure 9 is a transverse sectional view taken on line IX—IX of Figure 8.
Figure 10:
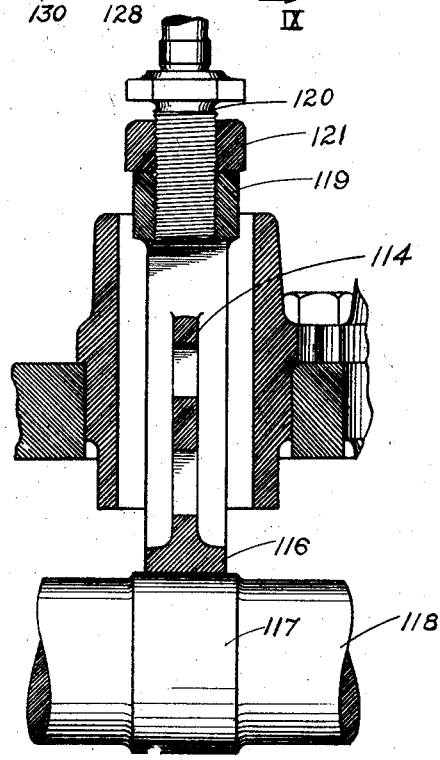
Figure 10 is a longitudinal sectional view taken on line X—X of Figure 9.

Referring first to Figure 1, a motor is shown comprising a crank case 1 upon which is mounted a cylinder block 2 provided with a plurality of cylinders 3, in which operate pistons 4, these are pivoted to connecting rods 5 attached to a crank shaft (not shown). The upper end of the cylinder block is closed by cylinder head 6 which contains valves 7, normally maintained against their seats by springs 8, and actuated by rocket arms 9 pivoted upon shafts 10 carried by cylinder head. A cam shaft 11 is journaled within the crank case and rotates to actuate the valves. A push rod 12 is interposed between the cam shaft and rocker arm and carries at its upper end socket 13 which is engaged by an adjustable head 14 carried by the rocker arm.

Between the lower end of the push rod and the cam shaft is a tappet 15, carried in a guide 16, these parts being more clearly illustrated in Figures 2 to 5. The valve tappet shown is a ross-head like member of substantial H-shaped cross section, comprising a central web 17 and arcuate bearing flanges 18 along its sides. Across the bottom of the tappet extends a curved flange 19 which bears directly upon the cam 20. The upper end of the tappet is formed with a flange 21 having a recess 22 for the reception of the rounded end 23 of the push rod.

The tappet may reciprocate in a slot within the guide 16, this slot having two curved bearing surfaces 24 engaged by flanges 18. The sides of the slot intermediate the bearing surface extend chordally across the guide and are recessed as at 25 to provide a large clearance between them and the sides of the tappet.

The exterior of the guide consists of two cylindrical surfaces 26 and 27 between which is a flange 28 which bears upon the top of crank case 1. The flange 28 is extended to one side at 29, the extensions of two adjacent guides coming nearly together.

Between these extensions a stud or bolt 30 is threaded into the crank case and a nut 31 threaded upon the bolt clamps the two extensions to the crank case and so retains both guides in operative position. Extensions 29 are notched to closely fit against bolt 30 to accurately aline the guides so that the chordal sides of the recesses in them will lie in planes normal to the axis of the cam shaft.

From the above it will be seen that substantially the entire bearing surface is situated to receive the lateral forces impressed upon the tappet. As the tappet is quite wide transversely of the engine, lateral forces imposed by the cam at the ends of its contact with the tappet are not converted into stresses tending to bend the same, but are transmitted directly through the web to one of the bearing faces, the metal of the tappet being placed only under compression and the pressure between the bearing faces being distributed over a relatively large area, so that unit pressures are low and wear is very materially reduced.

The surface of the curved flange 19 bears upon the cam thruout substantially its entire width so that no high unit pressure occurs between these surfaces, and wear between them is consequently slight. As the space at the sides of the tappet is large and ends abruptly, any dirt lodging therein will not be moved upon motion of the tappet to between the bearing faces and wear, due to dirt getting between the bearing faces, is therefore greatly reduced. While the tappet is very strong and has relatively large overall dimensions, it is extremely light in weight.

Figure 6 shows an application of my invention to the tappets of an L head motor. The motor consists of a crank case 101 carrying cylinder block 102 in which are formed cylinders 103. Pistons 104 reciprocate in these cylinders, being connected by connecting rods 105 to a crank-shaft in the crank-case. Mounted upon the cylinder block is a cylinder head 106 having and communicating with each cylinder a combustion chamber 107. Valves 108 are carried by the cylinder block and open into the chambers 107. Each valve has a stem 109 reciprocable in a guide 110, within the cylinder block and is maintained in closed position by the pressure of a spring 111 bearing upon a ferrule 112 which in turn bears upon frustro conical blocks 113 fitting into a groove in the valve stem. The valve stem is acted upon directly by the tappet, corresponding in this respect to the push rod described in conjunction with the first embodiment.

The tappet shown in Figures 5 to 10 is very similar to that above described. It consists of a body of substantially H-shaped cross section having a central web 114 and arcuate flanges 115, the lower end being formed into a curved flange 116 bearing upon a cam 117 carried by the cam-shaft 118. The upper end of the tappet is provided with an internally threaded boss 119 in which an adjustable plug or bolt 120 is threaded, the plug being supplied with a lock nut 121 so that it may be adjusted relative the tappet and locked in adjusted position.

The tappet reciprocates in a guide 122 which consists of cylindrical portions 123 and 124 between which is a flange 125 which rests upon the top of the crank-case. The interior of the guide is formed with arcuate bearing faces 126 engaged by flanges 115 and has chordally extending walls 127 to maintain the tappet against rotation. The flange 125 has an extension 128, the extensions of the adjacent guides nearly touching so that these may be clamped by a bolt 129 and a nut 130 in the manner of the flanges described in connection with the first embodiment. These extensions are offset from the center-to-center line of the adjacent tappets so that the clamping nut is situated toward the outside of the motor and is readily accessible through a hand-hole 131 in the cylinder block upon the removal of a cover 132.

As in the embodiment first described, the bearing faces are relatively far apart so that bending stresses are eliminated and that the bearing surfaces are so arranged that lateral forces on the tappet are distributed over and substantially normal to a large percentage of the bearing surface, there being no frictional engagement between the sides of the tappet intermediate the bearing faces and the guide, and no opportunity for dirt travelling around the tappet to its bearing surfaces.

While I have described the two illustrated embodiments of my invention which are particularly adapted to the engines shown, this has been done by way of illustration only and not by way of limitation, and as many other embodiments will obviously readily occur to those skilled in this art, I do not limit myself to the precise details shown and described but claim as my invention all variations, modifications and embodiments falling within the scope of the subjoined claims.

I claim:

1. A valve tappet of H-shaped cross section having transversely curved flanges and a guide therefor having curved ways in which said flanges slide.

2. A valve tappet of quadrilateral cross section having two opposite arcuate bearing faces, the sides between the bearing faces being recessed, a curved bearing face on one end, and a valve rod contacting socket at the other end.

3. In a motor, valve actuating mechanism comprising a cam-shaft within the crank-case of the motor, two cams thereon, a non-circular tappet bearing on one of said cams, a second non-circular tappet bearing on the other cam, a guide for the first tappet, comprising a sleeve extending into said crank-case and a flange seating upon the crank case, a similar guide for the other tappet, a bolt carried by the crank-case between said flanges, a nut threaded on said bolt and bearing upon said flanges, and notches in said flanges engaging said bolt maintaining said guides in alinement.

4. A valve tappet of H-shaped cross section having transversely curved flanges and a guide therefor having curved ways in which said flanges slide, the guide and tappet being spaced apart intermediate said flanges.

5. A valve tappet of H-shaped cross section having transversely curved flanges with chordal ends and a guide therefor having ways in which said flanges slide, the guide contacting the curved and chordal parts of the flanges and being spaced from the remainder of the tappet.

6. A valve tappet of H-shaped cross-section, a guide therefor, a curved cam-engaging flange at one end of said tappet, the cam-engaging surface of which is defined by elements parallel to the axis of the cam shaft with which it is designed to cooperate, and a flange at the opposite end provided with a bearing for a valve rod.

7. A valve tappet comprising a central web, a continuous peripheral flange comprising two parallel sides and two ends extending therefrom, the web being apertured.

8. A valve tappet of H-shaped cross-section, and a guide therefor having a quadrilateral opening in which the tappet may slide, engaging the outer sides and the edges of the flanges of the tappet.

In testimony whereof I hereunto affix my signature this 15th day of April, 1929.

HAROLD D. CHURCH.